UNITED STATES PATENT OFFICE.

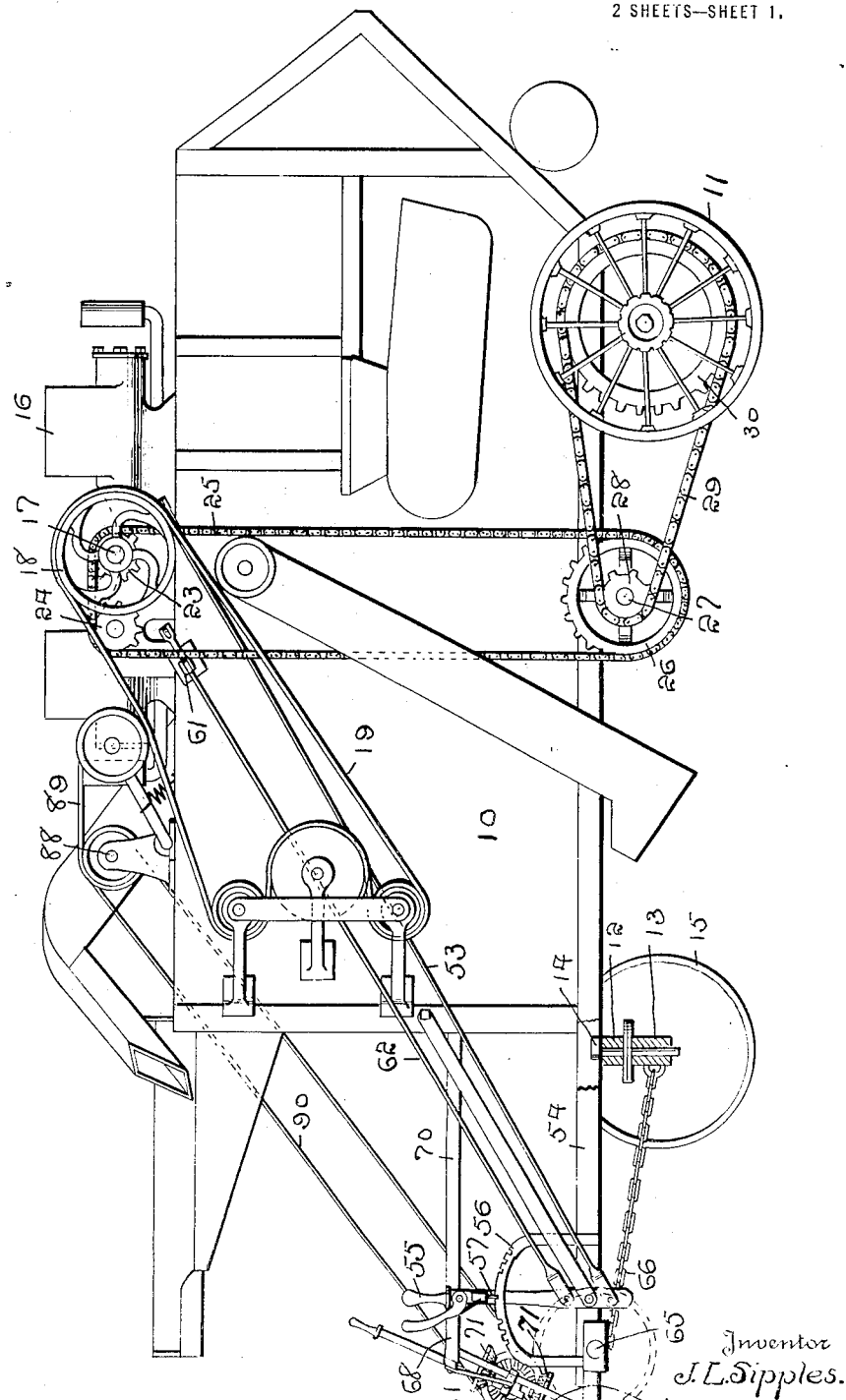

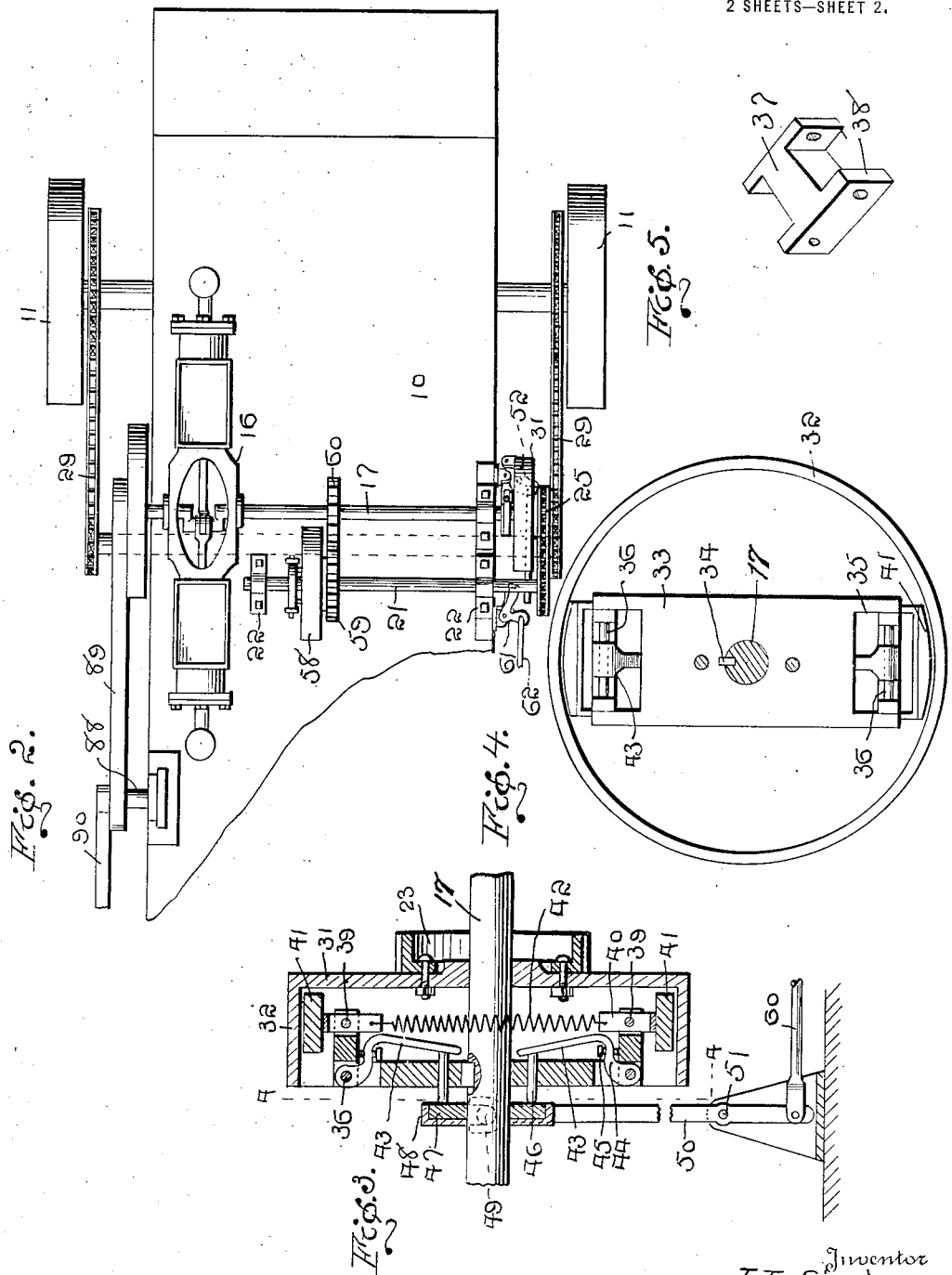

JAMES L. SIPPLES, OF CYNTHIANA, KENTUCKY.

PROPELLING MECHANISM FOR VEHICLES.

1,354,423.

Specification of Letters Patent.  Patented Sept. 28, 1920.

Application filed January 23, 1917. Serial No. 143,905.

*To all whom it may concern:*

Be it known that I, JAMES LEWIS SIPPLES, a citizen of the United States, residing at Cynthiana, in the county of Harrison and State of Kentucky, have invented certain new and useful Improvements in Propelling Mechanism for Vehicles; and I do hereby declare the following to be a full, clear, and exact description of the invention, such as will enable others skilled in the art to which it appertains to make and use the same.

This invention has for its object to provide a power transmitting or propelling mechanism especially designed for use in connection with portable threshing machines by which the power of the engine ordinarily used for operating the separator may be utilized for propelling the vehicle.

Another object is the provision of means operable by the engine for steering the vehicle.

With these and other objects in view, the invention consists in the novel construction, combination and arrangement of parts as will be hereinafter specifically described, claimed and illustrated in the accompanying drawings, in which:

Figure 1 represents a side elevation of a separator, illustrating the invention applied to use, Fig. 2 represents a fragmentary top plan view of the separator, Fig. 3 represents a detail sectional view through one of the clutches, Fig. 4 represents a view on the line 4—4 of Fig. 3, Fig. 5 represents a perspective view of a part of the clutch removed.

Referring to the drawings in detail, wherein similar reference numerals designate corresponding parts throughout the several views, the numeral 10 indicates the body of an ordinary type of separator, which is supported at its rear end upon the rear wheels 11 and is provided adjacent its forward extremity with a relatively stationary bolster 12, which is pivotally secured to the front axle 13 by a king bolt 14. The front or steering wheels 15 are carried by the front axle 13.

A preferred type of engine 16 is supported upon the body 10 of the separator, and the engine shaft 17 is provided with a relatively large pulley 18, supporting a belt 19, whereby power is transmitted from the engine to the separating mechanism of the machine, in the usual manner.

A second shaft 21 is supported in spaced parallel relation to the engine shaft 17 in bearings 22, supported upon the top of the body 10, and the terminals of the shafts 17 and 21 opposite the engine 16 are provided with sprocket wheels 23 and 24, respectively, over which is extended a chain 25. The lower portion of the chain 25 is extended over a relatively large sprocket wheel 26, which is supported upon a drive shaft 27 arranged under the body 10 and rigidly connected with a relatively small sprocket wheel 28. The shaft 27 extends transversely under the body 10 and is provided at each end with a relatively small sprocket wheel 28, one of which, as stated, is rigidly connected with the relatively large wheel 26. Sprocket chains 29 are extended over the sprocket wheels 28 and over the relatively large sprocket wheels 30 connected with the rear wheels 11, whereby rotary motion is transmitted from the drive shaft 27 to the rear wheels 11.

The wheel 23 is rotatably mounted upon the engine shaft 17 and is rigidly connected to the clutch member 31, which is also rotatably mounted upon the shaft 17. The clutch member or drum 31 is provided with a laterally projecting flange 32, in which is arranged a plate 33 rigidly connected with the shaft 17 by a key 34. The opposed terminals of the plate 33 are bifurcated, as indicated at 35, and receive the hinge rods 36 to which are pivotally secured the laterally projecting arms 37, having bifurcated terminals 38. The outer bifurcations of the arms 37 receive hinge rods 39, pivotally securing the inwardly directed arms 40 of the clutch shoes 41, which are arranged internally of and adapted to engage the flange 32 of the clutch drum, so as to lock the latter for rotation with the shaft 17 and the plate 33. The shoes 41 are arranged at diametrically opposed points within the drum 31, and are normally retained in inwardly extended or inoperative position by the tension of springs 42, which connect the inner terminals of the arms 40.

Actuating arms 43 are pivotally secured to the hinge rods 36 and are provided adjacent their pivoted terminals with offsets 44, in which are threaded screws 45 for engaging the pivoted arms 37, so as to swing the latter outwardly and engage the clutch shoes 41 with the flange of the clutch drum 31. The inner terminals of the pivoted arms 43 are engaged by pins 46, slidably mounted transversely through the plate 33 and engaged with a disk 47 received within a circular holder 48, having diametrically opposed trunnions 49 engaged in the bifurcated extremities of a clutch actuated lever 50, which is pivotally secured at 51 to the body 10 of the separator. The opposite terminal of the actuating lever 50 is connected with one arm of a bell crank 52, which is pivotally secured to the body 10, and is also connected with a rod 53 extending forwardly and downwardly to a point adjacent a platform 54 extending forwardly of the front end of the body 10 and supporting a hand lever 55 movable over a bar 56, having notches therein for receiving a locking member 57, whereby the lever is locked in various adjusted positions. The lower terminal of the rod 53 is connected with the hand lever 55 below the pivotal axis of the latter, and when the hand lever is swung forwardly, with relation to the body of the vehicle, the rod 53 is moved rearwardly, swinging the upper terminal of the clutch actuating lever 51 to the bell crank 52, so as to engage the clutch shoes 41 with the flange 32 of the drum, thus locking the drum and consequently the sprocket wheel 23 with the engine 17, and propelling the vehicle forwardly. When the lever 55 is swung to a vertical position, as shown in Fig. 1, the upper terminal of the lever 50 is moved outwardly with relation to the clutch drum 31, and the shoes 41 are automatically retracted by the springs 42, thus permitting the engine shaft to rotate within the drum.

The sprocket wheel 24 is rigidly connected with the second shaft 21 and said shaft rotatably supports a clutch 58, which is identical in construction to the clutch 31 and the drum of the clutch 58 is connected with a gear wheel 59, which meshes with a gear wheel 60 non-rotatably secured to the engine shaft 17, whereby the gear wheel 59 and drum of the clutch 58 are continuously rotated during operation of the engine. The shoes 41 of the clutch 58 are moved into engagement with the drum of the clutch by a lever 50, which is pivotally supported upon the body 10, so as to clutch the drum and gear wheel 59 with the shaft 21. The lever 50 is actuated by a rod 60, having connection with a bell crank 61 pivotally secured to the side of the body 10 and connected by a rod 62 with the hand lever 51 above the pivotal axis of the latter, so that when the lever is swung rearwardly and the sprocket wheel 23 released from the engine shaft 17, as above described, the shoes of the clutch 58 are moved into engagement with the drum, thus locking the gear wheels 59 for rotation with the shaft 21, and moving the chain 25 in a direction which will propel the separator rearwardly.

A shaft 65 is rotatably supported under the platform 54 and is attached to the forward ends of a pair of chains 66, which are extended rearwardly from the shaft 65 and are connected with the front axle 13 at points on opposite sides of the king bolt 14. The forward extremities of the chains 66 are oppositely wound upon the shaft 65, whereby as the latter is rotated the front axle 13 is oscillated upon the king bolt 14. An inclined shaft 67 is rotatably supported in bearings 68 carried by the upper and lower platforms 70 and 54, respectively, and a pair of oppositely disposed bevel gear wheels 71 are rotatably supported thereon. The gear wheels 71 are secured against longitudinal movement upon the shaft 67 and permanently mesh with a bevel gear wheel 72.

The lower portion of the shaft 67 is connected with a worm 85, which is engaged with a gear wheel 86, carried by the shaft 65, whereby rotary movement is transmitted from the shaft of the gear 72 through the bevel gear wheels 72 and 71, shaft 67, worm 85 and gear wheel 86 to the shaft 65.

A counter shaft 88 is rotatably supported upon the body 10 and is connected by a belt 89 or another approved type of power transmitting device to the engine shaft 17. A belt 90 is also connected with the counter shaft 88 and extends downwardly over a pulley 91 attached to the horizontal shaft of the gear 72, whereby rotary movement is transmitted from the engine shaft to the said horizontal shaft, so as to actuate the front axle 13.

What I claim is:

A driving mechanism for a vehicle carrying a separator comprising, a source of power, a power shaft connected therewith and traversing the vehicle, means for operating the separator from the power shaft, a counter-shaft extending parallel to said power shaft, a driven shaft traversing the vehicle and disposed adjacent the rear wheels of the same, sprocket wheels arranged on each of said three shafts, a sprocket chain connecting said three sprocket wheels, means connecting said driven shaft to said rear wheels, the sprocket wheel on said power shaft being loosely mounted thereon, a clutch coacting with said loosely mounted sprocket wheel, a pair of intermeshing gears mounted on said power and counter shafts, and a second clutch for coöperation with one of said gear wheels.

In testimony whereof I affix my signature in presence of two witnesses.

JAMES L. SIPPLES.

Witnesses:
J. A. CALDWELL,
JAMES S. GREEN.